United States Patent
Dykstra et al.

(10) Patent No.: US 10,190,402 B2
(45) Date of Patent: Jan. 29, 2019

(54) CONTROLLING A BOTTOM-HOLE ASSEMBLY IN A WELLBORE

(71) Applicant: Halliburton Energy Services, Inc., Houston, TX (US)

(72) Inventors: Jason D. Dykstra, Carrollton, TX (US); Yuzhen Xue, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/114,221

(22) PCT Filed: Mar. 11, 2014

(86) PCT No.: PCT/US2014/023645
§ 371 (c)(1),
(2) Date: Jul. 26, 2016

(87) PCT Pub. No.: WO2015/137931
PCT Pub. Date: Sep. 17, 2015

(65) Prior Publication Data
US 2017/0002641 A1   Jan. 5, 2017

(51) Int. Cl.
| | | |
|---|---|---|
| *G06F 19/00* | (2018.01) | |
| *E21B 44/02* | (2006.01) | |
| *E21B 44/00* | (2006.01) | |
| *E21B 12/02* | (2006.01) | |
| *E21B 44/04* | (2006.01) | |
| *E21B 44/08* | (2006.01) | |
| *E21B 45/00* | (2006.01) | |
| *G05B 13/02* | (2006.01) | |

(52) U.S. Cl.
CPC .............. *E21B 44/02* (2013.01); *E21B 12/02* (2013.01); *E21B 44/00* (2013.01); *E21B 44/04* (2013.01); *E21B 44/08* (2013.01); *E21B 45/00* (2013.01); *G05B 13/022* (2013.01); *G05B 2219/36188* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,365,222 A * | 12/1982 | Lampert | ............... | H01P 11/003 333/238 |
| 5,072,388 A * | 12/1991 | O'Sullivan | ........... | E21B 47/082 181/105 |
| 5,512,830 A * | 4/1996 | Kuckes | .................. | E21B 47/00 324/346 |
| 6,206,108 B1 | 3/2001 | MacDonald et al. | | |
| 6,388,577 B1 * | 5/2002 | Carstensen | ............. | E21B 34/06 340/854.3 |
| 6,513,606 B1 * | 2/2003 | Krueger | .................. | E21B 7/068 166/255.1 |
| 7,172,037 B2 | 2/2007 | Dashevskiy et al. | | |
| 7,457,619 B2 | 11/2008 | Ariyur et al. | | |
| 2002/0116130 A1 * | 8/2002 | Estes | ..................... | E21B 47/022 702/9 |
| 2005/0056463 A1 | 3/2005 | Aronstam et al. | | |
| 2005/0200498 A1 * | 9/2005 | Gleitman | .............. | E21B 17/003 340/854.4 |
| 2005/0264293 A1 * | 12/2005 | Gao | ..................... | G01V 11/002 324/326 |
| 2006/0122778 A1 * | 6/2006 | Gao | ..................... | G01V 11/002 702/7 |
| 2008/0264624 A1 * | 10/2008 | Hall | ........................ | G01V 3/26 166/66.5 |
| 2009/0250225 A1 | 10/2009 | Zaeper et al. | | |
| 2010/0106328 A1 | 4/2010 | Li et al. | | |
| 2011/0094765 A1 | 4/2011 | Aldrich et al. | | |
| 2011/0214878 A1 * | 9/2011 | Bailey | ...................... | E21B 7/00 166/369 |
| 2011/0272196 A1 * | 11/2011 | Konschuh | ................ | E21B 7/06 175/76 |
| 2012/0316787 A1 | 12/2012 | Moran et al. | | |
| 2013/0126241 A1 | 5/2013 | Boone et al. | | |
| 2013/0161097 A1 | 6/2013 | Benson et al. | | |
| 2015/0114628 A1 * | 4/2015 | Chen | ..................... | G01V 9/005 166/250.01 |
| 2015/0240615 A1 | 8/2015 | Dykstra et al. | | |

FOREIGN PATENT DOCUMENTS

WO   WO2015084402 A1   6/2015

OTHER PUBLICATIONS

Aldrich et al., "Extremum-Seeking Control for an Ultrasonic/Sonic Driller/Corer (USDC) Driven at High-Power", Jan. 2006, 12 pages.
Krstic, Miroslav, "Extremum Seeking Feedback Tools for Real-Time Optimization", Aug. 17, 2005, 20 pages.

(Continued)

*Primary Examiner* — Kidest Bahta
(74) *Attorney, Agent, or Firm* — John Wustenberg; Parker Justiss, P.C.

(57) ABSTRACT

Techniques for controlling a bottom hole assembly (BHA) include determining a first candidate BHA control signal; generating an input to a BHA control, the input comprising a perturbation signal superimposed on the first candidate BHA control signal; controlling the BHA using the input to the BHA control; determining a change in an objective value as a function of the perturbation signal, based on a received downhole sensor measurement; and generating, based on the change in the objective value, a second candidate BHA control signal.

20 Claims, 8 Drawing Sheets

(56) References Cited

OTHER PUBLICATIONS

Popovic et al. "Extremum Seeking Methods for Optimization of Variable Cam Timing Engine Operation", IEEE Transactions on Control Systems Technology, vol. 14, No. 3, May 2006, 10 pages.
Schuster, "Extremum Seeking", May 11-12, 2006, 23 pages.
PCT International Search Report and Written Opinion of the International Searching Authority, PCT/US2014/023645, dated Dec. 5, 2014, 11 pages.

\* cited by examiner

CONTROLLING A BOTTOM-HOLE ASSEMBLY IN A WELLBORE

CROSS-REFERENCE TO RELATED APPLICATIONS

This application is a U.S. National Phase Application under 35 U.S.C. § 371 and claims the benefit of priority to International Application No. PCT/US2014/023645, filed on Mar. 11, 2014, the contents of which are hereby incorporated by reference.

TECHNICAL BACKGROUND

This disclosure relates to automated control of wellbore operation for the production of hydrocarbons from subsurface formations.

BACKGROUND

Drilling for hydrocarbons, such as oil and gas, typically involves the operation of drilling equipment at underground depths that can reach down to thousands of feet below the surface. Such remote distances of downhole drilling equipment, combined with unpredictable downhole operating conditions and vibrational drilling disturbances, creates numerous challenges in accurately controlling the trajectory of a wellbore. Compounding these problems is often the existence of neighboring wellbores, sometimes within close proximity of each other, that restricts the tolerance for drilling error. Drilling operations typically collect measurements from downhole sensors, located at or near a bottom hole assembly (BHA), to detect various conditions related to the drilling, such as position and angle of the wellbore trajectory, characteristics of the rock formation, pressure, temperature, acoustics, radiation, etc. Such sensor measurement data is typically transmitted to the surface, where human operators analyze the data to adjust the downhole drilling equipment. However, sensor measurements can be inaccurate, delayed, or infrequent, limiting the effectiveness of using such measurements. Often, a human operator is left to use best-guess estimates of the wellbore trajectory in controlling the drilling operation.

DETAILED DESCRIPTION

Figure 1:
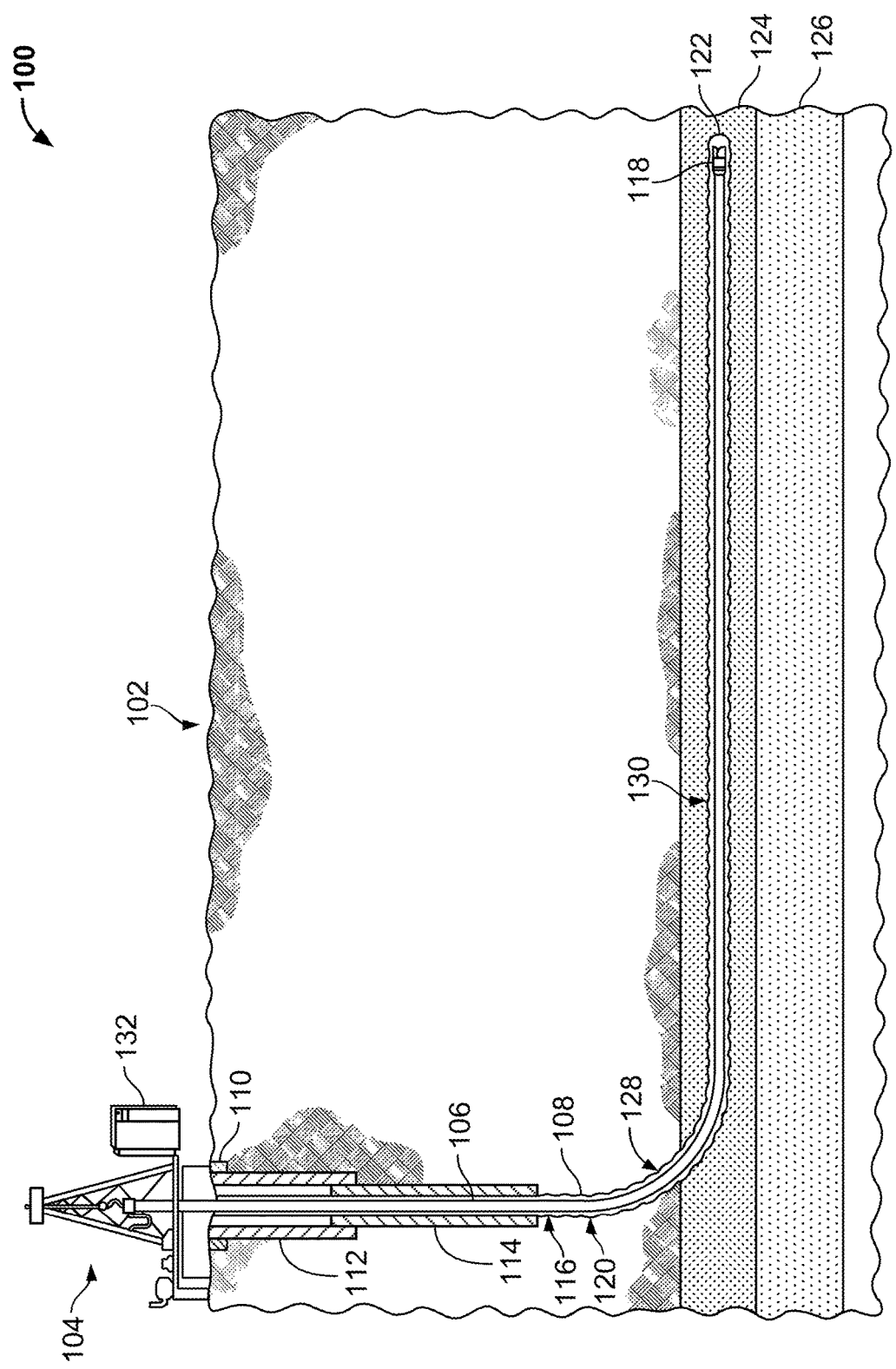
FIG. 1 illustrates an example of an implementation of at least a portion of a wellbore system in the context of a downhole operation.

This disclosure generally describes automated management of wellbore drilling operations by using extremum-seeking control of a BHA. In particular, techniques are described that automatically adapt BHA control parameters, in real time, to iteratively improve drilling performance and converge closer to a desired drilling objective. An input to a BHA control can be dynamically updated based on changing drilling conditions, which may be determined using any suitable source of information, such as downhole sensor measurements, manufacture-specified parameters, user-defined inputs, and/or wellbore planning information, as examples.

In some examples, an extremum-seeking BHA control technique can be a model-free adaptive control, such that it need not necessarily use a model of downhole BHA dynamics to update the BHA control. Instead, BHA control techniques can inject a probe signal into the drilling operation (e.g., by applying a known perturbation signal superimposed onto a desired BHA control signal), and then measure the response of downhole sensors to the probe signal to infer certain characteristics of downhole drilling performance. These inferred downhole characteristics can be processed by a BHA controller to determine adjustments in the BHA control that are likely to improve drilling operations. These adjustments can then be automatically applied as an input to the BHA control, in real time, along with another probe signal to again determine updated drilling performance and to adjust the BHA control.

The extremum-seeking control can thus iteratively probe-and-adapt the BHA control to converge closer to a desired drilling objective. The desired drilling objective may involve minimizing or maximizing one or more suitable metrics associated with the drilling operation. For example, the objective may include minimizing a cost function that represents one or more costs associated with the drilling operation, and the extremum-seeking control may be designed to iteratively seek a cost-minimizing BHA control. As another example, the objective may include maximizing a utility function that represents one or more desired benefits associated with the drilling operation, and the extremum-seeking control may be designed to iteratively seek a utility-maximizing BHA control. In general, an extremum-seeking control can be designed to iteratively adapt the BHA control towards any desired objective, not necessarily one that is limited to a minimum-point of a cost function or a maximum-point of a utility function. For example, an extremum-seeking control may use approximation techniques to automatically adapt the BHA control towards a desired objective that is an approximation of an extreme-point solution (e.g., if the precise extreme-point is unknown, or difficult to determine in real-time, or otherwise)

An extremum-seeking technique may determine an initial BHA control as a starting point for subsequent iterative adaptive controls. The initial BHA control may be chosen in any suitable manner, and may be determined prior to drilling operations or during drilling operations to re-initialize the drilling (e.g., if it is determined that the drilling has diverged away from the desired objective). In some examples, an initial BHA control may be derived, for example, as a solution to a steady-state model of drilling operations. A steady-state model of drilling operations may be determined based on first principles or based on data from other wellbores in the field that have similar formation and rock mechanics. The initial BHA control can be set as the steady-state optimal control input, which can be used as the initial estimation for the extremum-seeking control. Using a steady-state optimal solution as the initial BHA control may improve the efficiency of the iterative extremum-seeking search, but in general any suitable initial BHA control may be used, depending on available information and constraints.

After a BHA control signal is determined (either an initial control or an iterative update), a perturbation signal is superimposed onto the BHA control signal and the combined signals are applied as an input to the BHA control. In some examples, the perturbation signal is a sinusoidal signal with a fixed frequency and amplitude. By superimposing the sinusoid onto the BHA control signal, this adds a small, low-frequency perturbation to the BHA control input, which elicits a corresponding response in the drilling operation that can be measured via downhole sensor measurements. As an example, if the BHA control is rotational torque, and the steady-state value is equal to 100 foot-pounds of torque, then a perturbation signal may apply +/−1 foot-pounds of torque on top of the steady-state input. This results in an input to the BHA of a torque that oscillates between 99 to 101 foot-pounds. By measuring and analyzing the corresponding behavior of the drilling operation (e.g., via sensor measurements), the BHA controller is able to determine how to adjust the BHA control (torque) to better achieve a desired objective.

An extremum-seeking control is therefore able to automatically adapt to changing downhole conditions by repeatedly probing and measuring downhole conditions to determine an objective-approaching control input. Even if downhole conditions change in an unpredictable and unknown manner, resulting in unpredictable changes in the desired objective, the BHA controller is able to track and follow the changing conditions and automatically adapt the BHA control to seek the new objective.

In a general implementation, computer-implemented method of controlling a bottom hole assembly (BHA) includes determining a first candidate BHA control signal and generating an input to a BHA control, the input comprising a perturbation signal superimposed on the first candidate BHA control signal. The method also includes controlling the BHA using the input to the BHA control; determining a change in an objective value as a function of the perturbation signal, based on a received downhole sensor measurement; and generating, based on the change in the objective value, a second candidate BHA control signal.

Other general implementations include corresponding computer systems, apparatus, and computer programs recorded on one or more computer storage devices, each configured to perform the actions of the methods. A system of one or more computers can be configured to perform operations to perform the actions. One or more computer programs can be configured to perform particular operations or actions by virtue of including instructions that, when executed by data processing apparatus, cause the apparatus to perform the actions.

In a first aspect combinable with any of the general implementations, determining a change in an objective value as a function of the perturbation signal, based on a received downhole sensor measurement, includes determining whether the objective value has increased or decreased as a function of the perturbation signal; and generating, based on the change in the objective value, a second candidate BHA control signal includes adjusting the first candidate BHA control signal to generate the second candidate BHA control signal based on whether the objective value has increased or decreased.

In a second aspect combinable with any of the previous aspects, the objective value represents a cost of drilling, and adjusting the first candidate BHA control signal to generate the second candidate BHA control signal includes increasing the amplitude of the first candidate BHA control signal if the objective value has decreased as a function of the perturbation signal; decreasing the amplitude of the first candidate BHA control signal if the objective value has increased as a function of the perturbation signal; and maintaining the amplitude of the first candidate BHA control signal if the objective value has remained the same as a function of the perturbation signal.

In a third aspect combinable with any of the previous aspects, the objective value represents a desired performance of drilling and adjusting the first candidate BHA control signal to generate the second candidate BHA control signal includes decreasing the amplitude of the first candidate BHA control signal if the objective value has decreased as a function of the perturbation signal; increasing the amplitude of the first candidate BHA control signal if the objective value has increased as a function of the perturbation signal; and maintaining the amplitude of the first candidate BHA control signal if the objective value has remained the same as a function of the perturbation signal.

In a fourth aspect combinable with any of the previous aspects, determining whether the objective value has increased or decreased as a function of the perturbation signal includes determining an objective function that depends, at least in part, on downhole sensor measurements and inputs to the BHA control; using the objective function to compute fluctuations in the objective value, based at least in part, on the received downhole sensor measurements and inputs to the BHA control; and processing the fluctuations in the objective value to determine a rate-of-change of the objective value as a function of the perturbation signal that is superimposed on the first candidate BHA control signal.

In a fifth aspect combinable with any of the previous aspects, processing the fluctuations in the objective value to determine a rate-of-change of the objective value as a function of the perturbation signal that is superimposed on the first candidate BHA control signal includes applying a highpass filter to the fluctuations in the objective value; and applying a demodulator to an output of the highpass filter.

A sixth aspect combinable with any of the previous aspects further includes applying a lowpass filter to the demodulated output of the highpass filter; and applying an integrator to an output of the lowpass filter.

In a seventh aspect combinable with any of the previous aspects, at least one of the highpass filter or the demodulator is matched to the perturbation signal.

In an eighth aspect combinable with any of the previous aspects, the perturbation signal comprises a sinusoidal signal, and at least one of the highpass filter or the demodulator has a center frequency that is tuned to an oscillating frequency of the sinusoidal signal.

In a ninth aspect combinable with any of the previous aspects, determining a first candidate BHA control signal includes determining a steady-state solution to the objective function.

In a tenth aspect combinable with any of the previous aspects, determining a steady-state solution to the objective function includes determining a steady-state model of BHA dynamics by performing system identification using received downhole sensor measurements; determining the objective function as a combination of drilling metrics that are based on the received downhole sensor measurements; and determining a steady-state solution to the objective function based on the steady-state model of BHA dynamics.

In an eleventh aspect combinable with any of the previous aspects, the drilling metrics include at least one of a BHA control input energy, an energy dissipation ratio, drill bit wear, mud motor wear, a target energy efficiency, or a target rate of penetration (ROP).

In a twelfth aspect combinable with any of the previous aspects, determining a steady-state model of BHA dynamics is based on at least one of predictions of BHA dynamics or data from other wellbores, and determining the cost function further includes determining at least one weighting factor indicative of a relative importance between the cost metrics.

A thirteenth aspect combinable with any of the previous aspects further includes receiving updated downhole sensor measurements; determining an updated steady-state solution to the objective function based on the received updated downhole sensor measurements; and determining an updated first candidate BHA control signal based on the updated steady-state solution to the objective function.

In a fourteenth aspect combinable with any of the previous aspects, determining an updated steady-state solution to the objective function includes at least one of determining an updated model of BHA dynamics or determining an updated objective function.

In a fifteenth aspect combinable with any of the previous aspects, determining an updated objective function is based on at least one of received downhole sensor measurements, customer data, performance metrics, or manufacturing specifications.

A sixteenth aspect combinable with any of the previous aspects further includes generating an updated input to the BHA control, wherein the updated input includes an updated perturbation signal superimposed on the second candidate BHA control signal; controlling the BHA using the updated input to the BHA control; determining an updated change in the objective value as a function of the updated perturbation signal; and generating, based on the updated change in the objective value, a third candidate BHA control signal.

In a seventeenth aspect combinable with any of the previous aspects, the input to the BHA control includes at least one of torque on bit or weight on bit and the downhole sensor measurement corresponds to at least one of tension, torsion, bending, or vibration.

Various implementations of a control system for wellbore drilling according to the present disclosure may include none, one or some of the following features. For example, the system may reduce the negative impacts of uncertainty in a drilling system and improve drilling efficiency, stability, and robustness of drilling operations. In particular, techniques described herein may enable more accurate and precise control of the wellbore trajectory despite varying and unpredictable conditions in the wellbore environment. This control design automatically mitigates uncertainty in the drilling system by iteratively seeking improved inputs to a BHA control based on updated sensor measurements.

The downhole environment around a BHA in a wellbore is generally a complex system. In some examples, the system may include at least 4 control variables and 12 measurements. Conventional control strategies may not easily apply to BHA systems for various reasons, including the following. The interactions between different inputs and outputs can be strong and unpredictable, e.g., inclination measurements may depend on most of the control variables, such as two bend angles and packer inflation. In such scenarios, conventional design techniques may be limited in achieving desired performance. Another difficulty is that the number of outputs may be greater than the number of inputs, and it may not always be clear how to decouple the interactions between certain inputs and output. This may result in complex and numerous options that complicate the design of the BHA input controls. In such scenarios, the performance of the drilling operation typically depends on the tuning skills of a control system designer, which may be subject to human error.

Another difficulty with the number of measurements being greater than the number of control variables is that, under many cases, it may be difficult for all of the measurements to track their planned target values without encountering some offset. Such offset may lead to uncertainty in how to control the wellbore trajectory, which may lead to an overly-aggressive control that results in different outputs competing with each other. For example, if a near inclination sensor requires a larger bend angle, then this may result in more errors and uncertainty in one of the far inclination sensors. In some scenarios, this may result in a reduced stability margin, rendering the drilling operation more difficult to control accurately.

Techniques described herein provide a control strategy based on iterative measurement-based adaptive control that automatically adapt to changing drilling conditions, without necessarily requiring complex, and sometimes inaccurate, models of real-time BHA dynamics. Moreover, in scenarios in which the surrounding environment and design specification change quickly during a directional drilling operation, an adaptive probe-based technique can detect such changes and adapt the BHA control accordingly, in real-time.

The details of one or more implementations are set forth in the accompanying drawings and the description below. Other features, objects, and advantages will be apparent from the description and drawings, and from the claims.

FIG. 1 illustrates a portion of one implementation of a deviated wellbore system 100 according to the present disclosure. Although shown as a deviated system (e.g., with a directional, horizontal, or radiussed wellbore), the system can include a relatively vertical wellbore only (e.g., including normal drilling variations) as well as other types of wellbores (e.g., laterals, pattern wellbores, and otherwise). Moreover, although shown on a terranean surface, the system 100 may be located in a sub-sea or water-based environment. Generally, the deviated wellbore system 100 accesses one or more subterranean formations, and provides easier and more efficient production of hydrocarbons located in such subterranean formations. Further, the deviated wellbore system 100 may allow for easier and more efficient fracturing or stimulation operations. As illustrated in FIG. 1, the deviated wellbore system 100 includes a drilling assembly 104 deployed on a terranean surface 102. The drilling assembly 104 may be used to form a vertical wellbore portion 108 extending from the terranean surface 102 and through one or more geological formations in the Earth. One or more subterranean formations, such as productive formation 126, are located under the terranean surface 102. As will be explained in more detail below, one or more wellbore casings, such as a surface casing 112 and intermediate casing 114, may be installed in at least a portion of the vertical wellbore portion 108.

In some implementations, the drilling assembly 104 may be deployed on a body of water rather than the terranean surface 102. For instance, in some implementations, the terranean surface 102 may be an ocean, gulf, sea, or any other body of water under which hydrocarbon-bearing formations may be found. In short, reference to the terranean surface 102 includes both land and water surfaces and contemplates forming and/or developing one or more deviated wellbore systems 100 from either or both locations.

Generally, the drilling assembly 104 may be any appropriate assembly or drilling rig used to form wellbores or wellbores in the Earth. The drilling assembly 104 may use traditional techniques to form such wellbores, such as the vertical wellbore portion 108, or may use nontraditional or novel techniques. In some implementations, the drilling assembly 104 may use rotary drilling equipment to form such wellbores. Rotary drilling equipment is known and may consist of a drill string 106 and a bottom hole assembly (BHA) 118. In some implementations, the drilling assembly 104 may consist of a rotary drilling rig. Rotating equipment on such a rotary drilling rig may consist of components that serve to rotate a drill bit, which in turn forms a wellbore, such as the vertical wellbore portion 108, deeper and deeper into the ground. Rotating equipment consists of a number of components (not all shown here), which contribute to transferring power from a prime mover to the drill bit itself. The prime mover supplies power to a rotary table, or top direct drive system, which in turn supplies rotational power to the drill string 106. The drill string 106 is typically attached to the drill bit within the bottom hole assembly 118. A swivel, which is attached to hoisting equipment, carries much, if not all of, the weight of the drill string 106, but may allow it to rotate freely.

The drill string 106 typically consists of sections of heavy steel pipe, which are threaded so that they can interlock together. Below the drill pipe are one or more drill collars, which are heavier, thicker, and stronger than the drill pipe. The threaded drill collars help to add weight to the drill string 106 above the drill bit to ensure that there is enough downward pressure on the drill bit to allow the bit to drill through the one or more geological formations. The number and nature of the drill collars on any particular rotary rig may be altered depending on the downhole conditions experienced while drilling.

The drill bit is typically located within or attached to the bottom hole assembly 118, which is located at a downhole end of the drill string 106. The drill bit is primarily responsible for making contact with the material (e.g., rock) within the one or more geological formations and drilling through such material. According to the present disclosure, a drill bit type may be chosen depending on the type of geological formation encountered while drilling. For example, different geological formations encountered during drilling may require the use of different drill bits to achieve maximum drilling efficiency. Drill bits may be changed because of such differences in the formations or because the drill bits experience wear. Although such detail is not critical to the present disclosure, there are generally four types of drill bits, each suited for particular conditions. The four most common types of drill bits consist of: delayed or dragged bits, steel to rotary bits, polycrystalline diamond compact bits, and diamond bits. Regardless of the particular drill bits selected, continuous removal of the "cuttings" is essential to rotary drilling.

The circulating system of a rotary drilling operation, such as the drilling assembly 104, may be an additional component of the drilling assembly 104. Generally, the circulating system has a number of main objectives, including cooling and lubricating the drill bit, removing the cuttings from the drill bit and the wellbore, and coating the walls of the wellbore with a mud type cake. The circulating system consists of drilling fluid, which is circulated down through the wellbore throughout the drilling process. Typically, the components of the circulating system include drilling fluid pumps, compressors, related plumbing fixtures, and specialty injectors for the addition of additives to the drilling fluid. In some implementations, such as, for example, during a horizontal or directional drilling process, downhole motors may be used in conjunction with or in the bottom hole assembly 118. Such a downhole motor may be a mud motor with a turbine arrangement, or a progressive cavity arrangement, such as a Moineau motor. These motors receive the drilling fluid through the drill string 106 and rotate to drive the drill bit or change directions in the drilling operation.

In many rotary drilling operations, the drilling fluid is pumped down the drill string 106 and out through ports or jets in the drill bit. The fluid then flows up toward the surface 102 within an annular space (e.g., an annulus) between the wellbore portion 108 and the drill string 106, carrying cuttings in suspension to the surface. The drilling fluid, much like the drill bit, may be chosen depending on the type of geological conditions found under subterranean surface 102. For example, certain geological conditions found and some subterranean formations may require that a liquid, such as water, be used as the drilling fluid. In such situations, in excess of 100,000 gallons of water may be required to complete a drilling operation. If water by itself is not suitable to carry the drill cuttings out of the bore hole or is not of sufficient density to control the pressures in the well, clay additives (bentonite) or polymer-based additives, may be added to the water to form drilling fluid (e.g., drilling mud). As noted above, there may be concerns regarding the use of such additives in underground formations which may be adjacent to or near subterranean formations holding fresh water.

In some implementations, the drilling assembly 104 and the bottom hole assembly 118 may operate with air or foam as the drilling fluid. For instance, in an air rotary drilling process, compressed air lifts the cuttings generated by the drill bit vertically upward through the annulus to the terranean surface 102. Large compressors may provide air that is then forced down the drill string 106 and eventually escapes through the small ports or jets in the drill bit. Cuttings removed to the terranean surface 102 are then collected.

As noted above, the choice of drilling fluid may depend on the type of geological formations encountered during the drilling operations. Further, this decision may be impacted by the type of drilling, such as vertical drilling, horizontal drilling, or directional drilling. In some cases, for example, certain geological formations may be more amenable to air drilling when drilled vertically as compared to drilled directionally or horizontally.

As illustrated in FIG. 1, the bottom hole assembly 118, including the drill bit, drills or creates the vertical wellbore portion 108, which extends from the terranean surface 102 towards the target subterranean formation 124 and the productive formation 126. In some implementations, the target subterranean formation 124 may be a geological formation amenable to air drilling. In addition, in some implementations, the productive formation 126 may be a geological formation that is less amenable to air drilling processes. As illustrated in FIG. 1, the productive formation 126 is directly adjacent to and under the target formation 124. Alternatively, in some implementations, there may be one or more intermediate subterranean formations (e.g., different rock or mineral formations) between the target subterranean formation 124 and the productive formation 126.

In some implementations of the deviated wellbore system 100, the vertical wellbore portion 108 may be cased with one or more casings. As illustrated, the vertical wellbore portion 108 includes a conductor casing 110, which extends from the terranean surface 102 shortly into the Earth. A portion of the vertical wellbore portion 108 enclosed by the conductor casing 110 may be a large diameter wellbore. Additionally, in some implementations, the vertical wellbore portion 108 may be offset from vertical (e.g., a slant wellbore). Even further, in some implementations, the vertical wellbore portion 108 may be a stepped wellbore, such that a portion is drilled vertically downward and then curved to a substantially horizontal wellbore portion. The substantially horizontal wellbore portion may then be turned downward to a second substantially vertical portion, which is then turned to a second substantially horizontal wellbore portion. Additional substantially vertical and horizontal wellbore portions may be added according to, for example, the type of terranean surface 102, the depth of one or more target subterranean formations, the depth of one or more productive subterranean formations, and/or other criteria.

Downhole of the conductor casing 110 may be the surface casing 112. The surface casing 112 may enclose a slightly smaller wellbore and protect the vertical wellbore portion 108 from intrusion of, for example, freshwater aquifers located near the terranean surface 102. The vertical wellbore portion 108 may than extend vertically downward toward a kickoff point 120, which may be between 500 and 1,000 feet above the target subterranean formation 124. This portion of the vertical wellbore portion 108 may be enclosed by the intermediate casing 114. The diameter of the vertical wellbore portion 108 at any point within its length, as well as the casing size of any of the aforementioned casings, may be an appropriate size depending on the drilling process.

Upon reaching the kickoff point 120, drilling tools such as logging and measurement equipment may be deployed into the wellbore portion 108. At that point, a determination of the exact location of the bottom hole assembly 118 may be made and transmitted to the terranean surface 102. Further, upon reaching the kickoff point 120, the bottom hole assembly 118 may be changed or adjusted such that appropriate directional drilling tools may be inserted into the vertical wellbore portion 108.

As illustrated in FIG. 1, a curved wellbore portion 128 and a horizontal wellbore portion 130 have been formed within one or more geological formations. Typically, the curved wellbore portion 128 may be drilled starting from the downhole end of the vertical wellbore portion 108 and deviated from the vertical wellbore portion 108 toward a predetermined azimuth gaining from between 9 and 18 degrees of angle per 100 feet drilled. Alternatively, different predetermined azimuth may be used to drill the curved wellbore portion 128. In drilling the curved wellbore portion 128, the bottom hole assembly 118 often uses measurement-while-drilling ("MWD") equipment to more precisely determine the location of the drill bit within the one or more geological formations, such as the target subterranean formation 124. Generally, MWD equipment may be utilized to directionally steer the drill bit as it forms the curved wellbore portion 128, as well as the horizontal wellbore portion 130.

Alternatively to or in addition to MWD data being compiled during drilling of the wellbore portions shown in FIG. 1, certain high-fidelity measurements (e.g., surveys) may be taken during the drilling of the wellbore portions. For example, surveys may be taken periodically in time (e.g., at particular time durations of drilling, periodically in wellbore length (e.g., at particular distances drilled, such as every 30 feet or otherwise), or as needed or desired (e.g., when there is a concern about the path of the wellbore). Typically, during a survey, a completed measurement of the inclination and azimuth of a location in a well (typically the total depth at the time of measurement) is made in order to know, with reasonable accuracy, that a correct or particular wellbore path is being followed (e.g., according to a wellbore plan). Further, position may be helpful to know in case a relief well must be drilled. High-fidelity measurements may include inclination from vertical and the azimuth (or compass heading) of the wellbore if the direction of the path is critical. These high-fidelity measurements may be made at discrete points in the well, and the approximate path of the wellbore computed from the discrete points. The high-fidelity measurements may be made with any suitable high-fidelity sensor. Examples include, for instance, simple pendulum-like devices to complex electronic accelerometers and gyroscopes. For example, in simple pendulum measurements, the position of a freely hanging pendulum relative to a measurement grid (attached to the housing of a measurement tool and assumed to represent the path of the wellbore) is captured on photographic film. The film is developed and examined when the tool is removed from the wellbore, either on wireline or the next time pipe is tripped out of the hole.

The horizontal wellbore portion 130 may typically extend for hundreds, if not thousands, of feet within the target subterranean formation 124. Although FIG. 1 illustrates the horizontal wellbore portion 130 as exactly perpendicular to the vertical wellbore portion 108, it is understood that directionally drilled wellbores, such as the horizontal wellbore portion 130, have some variation in their paths. Thus, the horizontal wellbore portion 130 may include a "zigzag" path yet remain in the target subterranean formation 124. Typically, the horizontal wellbore portion 130 is drilled to a predetermined end point 122, which, as noted above, may be up to thousands of feet from the kickoff point 120. As noted above, in some implementations, the curved wellbore portion 128 and the horizontal wellbore portion 130 may be formed utilizing an air drilling process that uses air or foam as the drilling fluid.

The wellbore system 100 also includes a controller 132 that is communicative with the BHA 118. The controller 132 may be located at the wellsite (e.g., at or near drilling assembly 104) or may be remote from the wellsite. The controller 132 may also be communicative with other systems, devices, databases, and networks. Generally, the controller 132 may include a processor based computer or computers (e.g., desktop, laptop, server, mobile device, cell phone, or otherwise) that includes memory (e.g., magnetic, optical, RAM/ROM, removable, remote or local), a network interface (e.g., software/hardware based interface), and one or more input/output peripherals (e.g., display devices, keyboard, mouse, touchscreen, and others).

The controller 132 may at least partially control, manage, and execute operations associated with the drilling operation of the BHA. In some aspects, the controller 132 may control and adjust one or more of the illustrated components of wellbore system 100 dynamically, such as, in real-time during drilling operations at the wellbore system 100. The real-time control may be adjusted based on sensor measurement data or based on changing predictions of the wellbore trajectory, even without any sensor measurements.

The controller 132 may perform at least an initial (or periodically updated) BHA control operation based on a steady-state model of BHA dynamics, and subsequently perform real-time BHA control operations without necessarily relying on a model of BHA dynamics. The initial steady-state model of BHA dynamics may include ROP or drilling direction or bit vibration as a function of surface inputs such as torque, hook load, etc. The controller 132 may use the steady-state model of BHA dynamics to determine an initial starting point for a BHA control, after which downhole sensor measurements, and other data, can be used to determine iterative objective-improving adaptations of the BHA control in real-time.

Due to random noise and potential inaccuracies in measurements, the downhole conditions are not exactly known, but rather inferred. Based on these inferences, the controller determines adjustment to the BHA control so that the drilling operation is likely to converge towards a desired objective. The objective may be represented by a mathematical objective function, which may be a combination of one or more drilling metrics. In some examples, the drilling metrics in the objective function may be weighted by one or more weighting factors, which may also be dynamically adapted based on measurements, predictions and other information, in response to changing conditions in the wellbore.

As an illustrative example, the desired drilling objective may involve any suitable drilling metric or combination of drilling metrics, such as rate of penetration (ROP), bit/motor wear, cutting efficiency, control input energy, and energy dissipation ratio from the surface to the bit, as examples. The BHA control inputs can include, as examples, rotational torque, surface hook load, pump rate, and/or top drive. In some examples, the BHA control inputs may be applied downhole, in addition or as an alternative to inputs at the surface.

Figure 2:
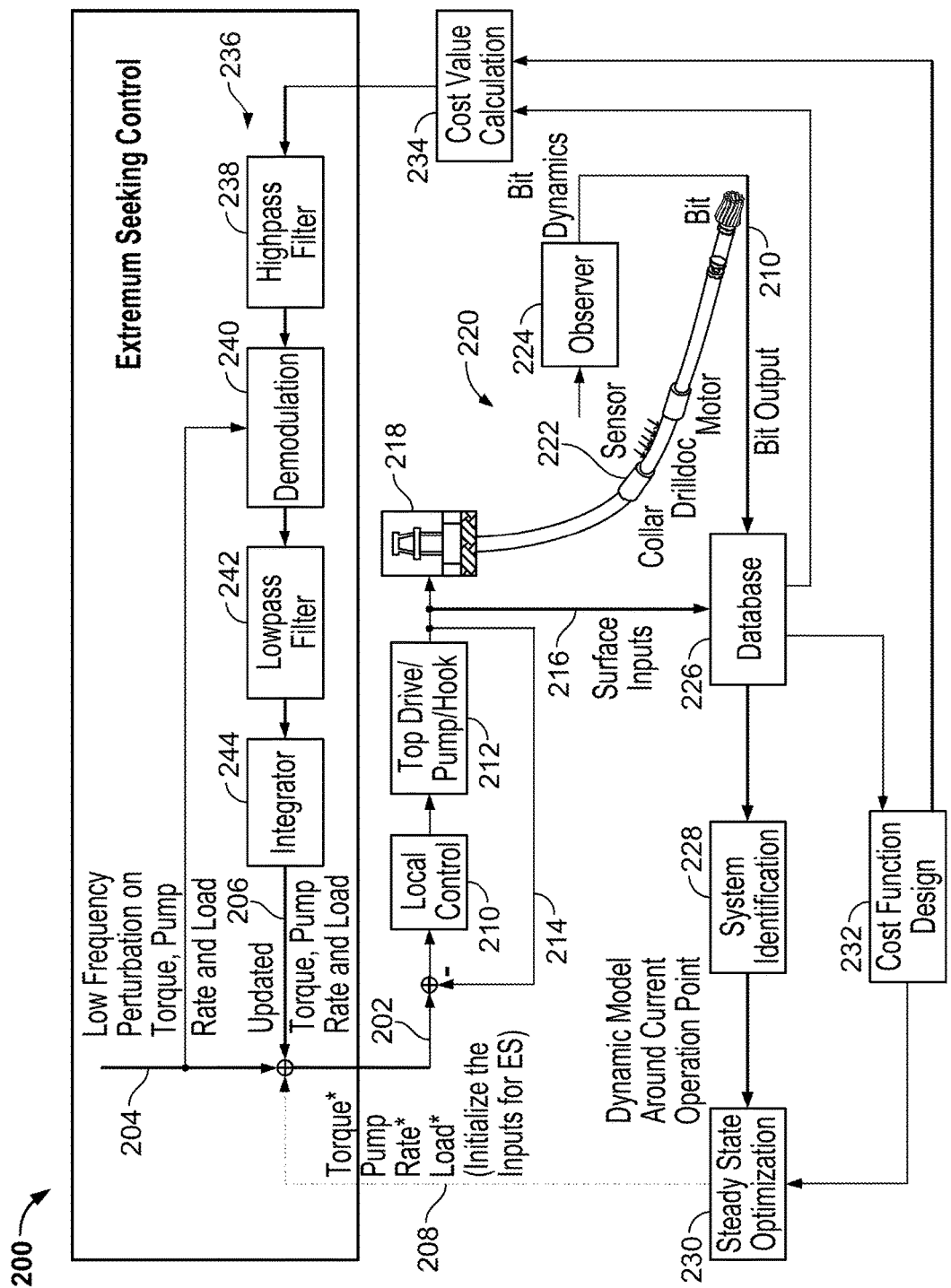
FIG. 2 illustrates an example of a processing flow for automatically adapting an input to a BHA control in response to changing conditions in the wellbore.

FIG. 2 illustrates an example of a processing flow for automatically adapting a BHA control input in response to changing conditions in the wellbore. The example processing flow 200 of FIG. 2 may be performed, for example, by a controller (e.g., controller 132 in FIG. 1) of a BHA (e.g., BHA 118 in FIG. 1). In the example of FIG. 2, the extremum-seeking control applies an input to the drilling system, such as input 202, which includes one or more component signals, including a perturbation signal 204, an updated BHA control signal 206. During an initialization (or re-initialization) operation, the input 202 includes an initial steady-state BHA control signal 208 instead of the updated BHA control signal 204. The steady-state input 208 is used as an initial estimate of the BHA control input. If this initial steady-state input 208 is in a vicinity of the actual optimum control for the real-world system, then the subsequent extremum-seeking control may efficiently converge to the actual optimum control.

To apply an extremum-seeking control, the inputs 202 are first initialized as the summation of the initial steady-state control estimate 208 and the predefined low-frequency perturbation 204. In this example, these inputs 202 are passed into the drilling system through the local controllers 210 and a top drive or pump or hook 212. In some examples, a feedback signal 214 may be provided. The surface inputs 216 may be applied to the drilling system 218, and bit outputs may be estimated from downhole sensor tool measurements, in stage 220.

In step 220, sensor measurements may be taken in a downhole portion of the drilling equipment. For example, a sensor measurement tool may be included as a part of the drilling system and may include a short section of pipe with strain gauges which provide direct, real-time measurements of tension, torsion, bending, and vibration around a drilling collar 222. In some examples, sensor measurement tools may be installed next to the drilling collar 222, although in general, downhole sensors may be situated in any suitable downhole location of the drilling equipment.

In step 224, one or more downhole sensor measurements (e.g., from the sensor measurement tool at the drilling collar 222) may be used by an observer to estimate the bit dynamics, including the weight-on-bit (WOB), torque-on-bit (TOB), bit vibration, ROP, etc. The observer stage 224 may be implemented using any suitable technique that allows estimating bit dynamics based on downhole sensor measurements, or based on other measurements that may be taken closer to the surface. These estimates of bit dynamics may indicate, for example, the bit-rock interaction forces that act upon the drilling operations.

In step 226, the bit output from the observer stage 224 and the surface BHA input data 216 may be stored in a database. The database may also store other information related to the drilling operation (e.g., drilling path, formation and rock mechanics, bit and motor efficiency model, etc.). The stored data may be used for a variety of purposes. For example, the stored data can be used in a system identification stage 228 to determine a steady-state BHA control 208, e.g., in step 230, that can be applied to initialize (or re-initialize) the extremum-seeking BHA adaptive control. Additionally or alternatively, the stored data can be used to determine an objective function design, such as a cost function in step 232. In some examples, the system identification step 228 may occur on a slower time scale than the cost function design step 232.

In the system identification step 228, the steady-state drilling system model from the surface inputs to the bit outputs may be initialized based on offset data, first principles, or offsite wellbore data. For example, when the steady-state model outputs diverge from the actual measured bit outputs by greater than some predefined threshold, the system identification stage 228 may be triggered and the steady-state drilling model may be updated. The parameters in the steady-state model typically vary slowly, e.g. parameters derived from the bit/motor wear and change of rock mechanics. Therefore, in some examples, the system identification stage 2228 may only be performed intermittently as required to maintain a specified accuracy in the steady-state model.

In addition, the cost function stage 232 may use the stored database information to determine a cost function (or more generally, any suitable objective function may be determined that involves costs or utilities). As an example, a cost function c(u) may be designed based on drilling objectives and weighting parameters according to Equation 1 below:

$$c(u) = \int a_1 (ROP - ROP^*)^2 + a_2 r_d^2 + a_3 w^2 + a_4 (E_C - E_C^*)^2 + a_5 u^2 \quad (1)$$

where u denotes the surface BHA control inputs, $r_d$ denotes energy dissipation ratio, w denotes bit wear and mud motor wear, $E_C$ and $E_C^*$ denote real and desired cutting efficiencies, respectively, ROP and ROP* denote real and desired rates of penetration, respectively, and $a_1$ to $a_5$ denote weighting parameters that sum to 1 (e.g., here $a_i \geq 0$ for any i). The weighting parameters may be selected based on the current drilling requirement. For example, if the replacement of the bit and mud motor are expensive, then the weighting parameter for the bit and motor wear may be of considerable value in order to extend the life or retain the efficiency of bit and mud motor. On the other hand, if energy dissipation ratio is a primary concern, then $a_2$ may be set to be 1 while the other weighting parameters may be set to be zero (in which case, minimizing the cost function simply corresponds to minimizing the energy dissipation ratio). The weighting parameters can also be adapted based on customer requirements, or based on changing conditions in the wellbore, or based on other information. For example, in hard rock environments, there may be more emphasis on how energy is transferred to reduce vibrational behavior). In other scenarios, it may be desirable to achieve higher ROP, and the weighting parameters can be set accordingly.

The energy dissipation ratio $r_d$ is the ratio between the surface energy and the effective bit working energy (this ratio is also sometimes referred to as the mechanical-specific energy). The surface energy corresponds to the energy expended in applying the surface inputs and is calculated from the surface hook load, torque and pump rate. The effective bit working energy corresponds to downhole energy (e.g., the amount of work being done in destroying rock) and is calculated from the ROP and the planned wellbore path. In general, the cost function may be based on other information as well, including customer requirements, manufacturer specifications, or other external factors.

During drilling operations, surface energy that is associated with the top drive, the torsional motor, and the mud pump is exerted on the drill pipe. This energy passes through the drill pipe and drives the drill bit. Because of the impact and rubbing force between the drill pipe and case, as well as the fluid-drill pipe interaction and the nonproductive bit vibration, there can be a considerable energy loss between the surface energy and the bit effective working energy. Such loss may include parasitic load and vibration dissipation. This energy loss may be more pronounced under certain situations, such as micro-tortuosity in the drilling path, pipe buckling, wear, stick-slip, and bit whirling. A preferred embodiment will automatically reduce the energy dissipation from these unwanted effects, and thus improve the drilling efficiency.

In the steady-state optimization stage 230, after a newly-identified steady-state model is available from the system identification stage 228, a steady state optimization may be performed to determine a steady-state optimal BHA control (e.g., one that maximizes the effective bit working energy, resulting in the optimal torque, hook load and pump rate). However, this steady-state model may not accurately reflect the dynamics of the real-time drilling environment. Complicated drilling interactions, process uncertainties, and transient behavior in the actual drilling system can introduce differences between the real system and the steady-state model. As a result, the theoretically-optimal steady-state BHA control inputs may not be optimal when applied in the actual system. However, for the purposes of extremum-seeking BHA control, the steady-state solution may provide a starting point from which iterative improvements of BHA control can be applied to drive the drilling operation close to a desired objective. The real-time extremum-seeking control scheme therefore adapts to the changing wellbore conditions to iteratively search for improvements to the theoretical steady-state solution.

The iterative updates are performed by evaluating a cost value, e.g., in step 234, using the cost function designed in step 232. The cost value is a time-varying value that indicates how the value of the designed cost function (generally, an objective function) has changed in response to the applied BHA control input. The cost function (e.g., the function determined in stage 232) transforms the raw bit data received from downhole sensors (at stage 224) into a cost value (at stage 234), which provides an operationally meaningful representation of how the drilling operation is performing in response to the applied BHA input.

The cost value is then processed by the extremum-seeking control stage 236 to determine an updated BHA control input that converges closer to the desired objective. In particular, the cost value is passed through a highpass filter in stage 238. The resulting signal is then demodulated in stage 240 by multiplying the signal with an oscillating signal at the same frequency as the perturbation signal 204. As described in FIG. 3, whether this demodulated signal is a positive-valued signal or a negative-valued signal indicates whether the BHA control should be increased or decreased to reduce the cost value. In some examples, the demodulated signal that is output from stage 240 may undergo further processing, such as passing through a lowpass filter stage 242 followed by an integrator stage 244. This results in an updated candidate BHA control signal 206.

The updated candidate BHA control signal is then added to the low-frequency perturbation signal 204, and the combined signals are then passed as an input 202 to the drilling system 218 through the local controllers 210 and 212 for a new iteration. In the extremum-seeking process, the candidate BHA control signal 206 is therefore designed to iteratively converge to the desired objective (in this case, minimizing the cost function designed in stage 232). The positive or negative sign of the output from the demodulation stage 240 represents the gradient of the cost function at the operating point of the previous BHA control input.

Figure 3:
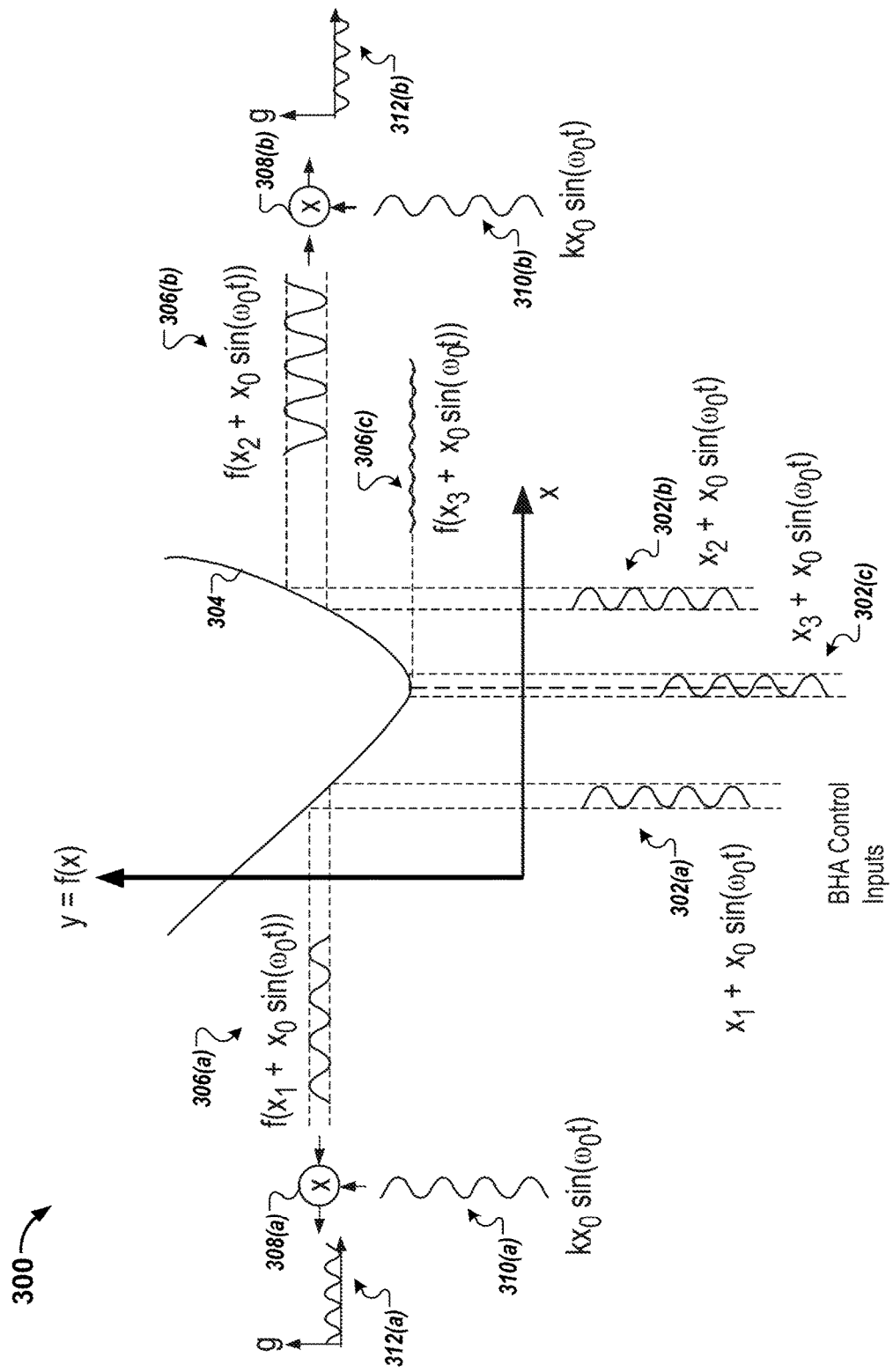
FIG. 3 is a graphical sketch of an example of applying a perturbation signal to determine a change in an objective value of a drilling operation.

FIG. 3 is a graphical sketch of an example of applying a perturbation signal to determine a change in an objective value of a drilling operation. In this example, three different BHA inputs are shown, 302(a), 302(b), and 302(c). Each of the three inputs includes a candidate BHA control signal, $x_1$, $x_2$, and $x_3$, respectively, each of which is superimposed with a fixed perturbation signal, $x_0 \sin \omega_0 t$. If the first input 302(a) were applied to the BHA control, the resulting sensor measurements (e.g., as measured in stage 220 of FIG. 2) would be used determine a cost function 304 (e.g., as designed in stage 232 of FIG. 2). Based on the cost function 304, cost values 306(a) would be determined that are associated with the input 302(a). The cost values 306(a) are approximately in the form of a sinusoidal signal (presuming small-amplitude variations in the input 302(a) relative to changes in the cost function 304), and the oscillations of the sinusoid-like signal 306(a) represent variations in the cost that are in response to the variations in the perturbation signal applied to the input 302(a).

The cost value 306(a) is then demodulated in stage 308(a) by multiplying with an oscillating signal 310(a) that has the same frequency as the perturbation signal in the input 302(a). The resulting demodulated signal 312(a) is positive (above the x-axis) in this example because the cost value 306(a) is in-phase with respect to the oscillating signal 310(a). The in-phase property of the cost value 306(a) is caused by the falling-edge slope of the cost function 304 at the point of the input 302(a). Therefore, the positive nature of the demodulated signal (e.g., the output of the demodulation stage 240) indicates that the cost function 304 has a negative slope at the operating point of the input 302(a), and therefore that the input 302(a) should be increased in order to further reduce the cost value. Subsequent low-pass filtering (e.g., 242 in FIG. 2) and integration (e.g., e.g., 244 in FIG. 2) may be used to smooth and aggregate the demodulated signal, resulting in a more definitive indication that the slope of the cost function 304 is negative.

Alternatively, if the second input 302(b) were applied to the BHA control, the resulting sensor measurements (e.g., as measured in stage 220 of FIG. 2) would be used determine the cost function 304 (e.g., as designed in stage 232 of FIG.

2). Based on the cost function 304, cost values 306(b) would be determined that are associated with the input 304(b). The cost values 306(b) are approximately in the form of a sinusoidal signal (presuming small-amplitude variations in the input 302(b) relative to changes in the cost function 304), and the oscillations of the sinusoid-like signal 306(b) represent variations in the cost that are in response to the variations in the perturbation signal applied to the input 302(b).

The cost value 306(b) is then demodulated in stage 308(a) by multiplying with an oscillating signal 310(b) that has the same frequency as the perturbation signal in the input 302(b). The resulting demodulated signal 312(b) is negative (below the x-axis) in this example because the cost value 306(b) is out-of-phase with respect to the oscillating signal 310(b). The out-of-phase property of the cost value 306(a) is caused by the rising-edge slope of the cost function 304 at the point of the input 302(a). Therefore, the negative nature of the demodulated signal (e.g., the output of the demodulation stage 240) indicates that the cost function 304 has a positive slope at the operating point of the input 302(b), and therefore that the input 302(b) should be decreased in order to further reduce the cost value.

Finally, in this example, if the third input 302(c), which is much closer to the minimum-cost input than the other two inputs, were applied to the BHA control, then resulting cost values 306(c) would be determined. In this case, since the cost value 306(c) has very small amplitude and oscillates equally about the x-axis due to the nearly-zero-slope of the cost function 304 at the point of the input 302(a). Therefore, the near-zero nature of the cost value (and subsequent demodulated signal) indicates that the cost function 304 has a nearly-zero slope at the operating point of the input 302(c), and therefore that the input 302(c) is nearly-optimal. Any subsequent iteration will not move very far from this operating point, unless the drilling conditions change (resulting in changes to the cost function 304). Although the example of FIG. 3 describes minimizing a cost function, the extremum-seeking control may also be applied to maximizing a utility function. A utility function may represent any suitable metric whose increase indicates improvements in drilling operation (e.g., efficiency, energy savings, etc.). In some examples, the utility function may simply be a negative of a cost function. Regardless of the exact nature of the objective function, an objective function may be determined using any suitable technique, such as first principles, historical measurement data, or data from nearby wellbores.

Figure 4:
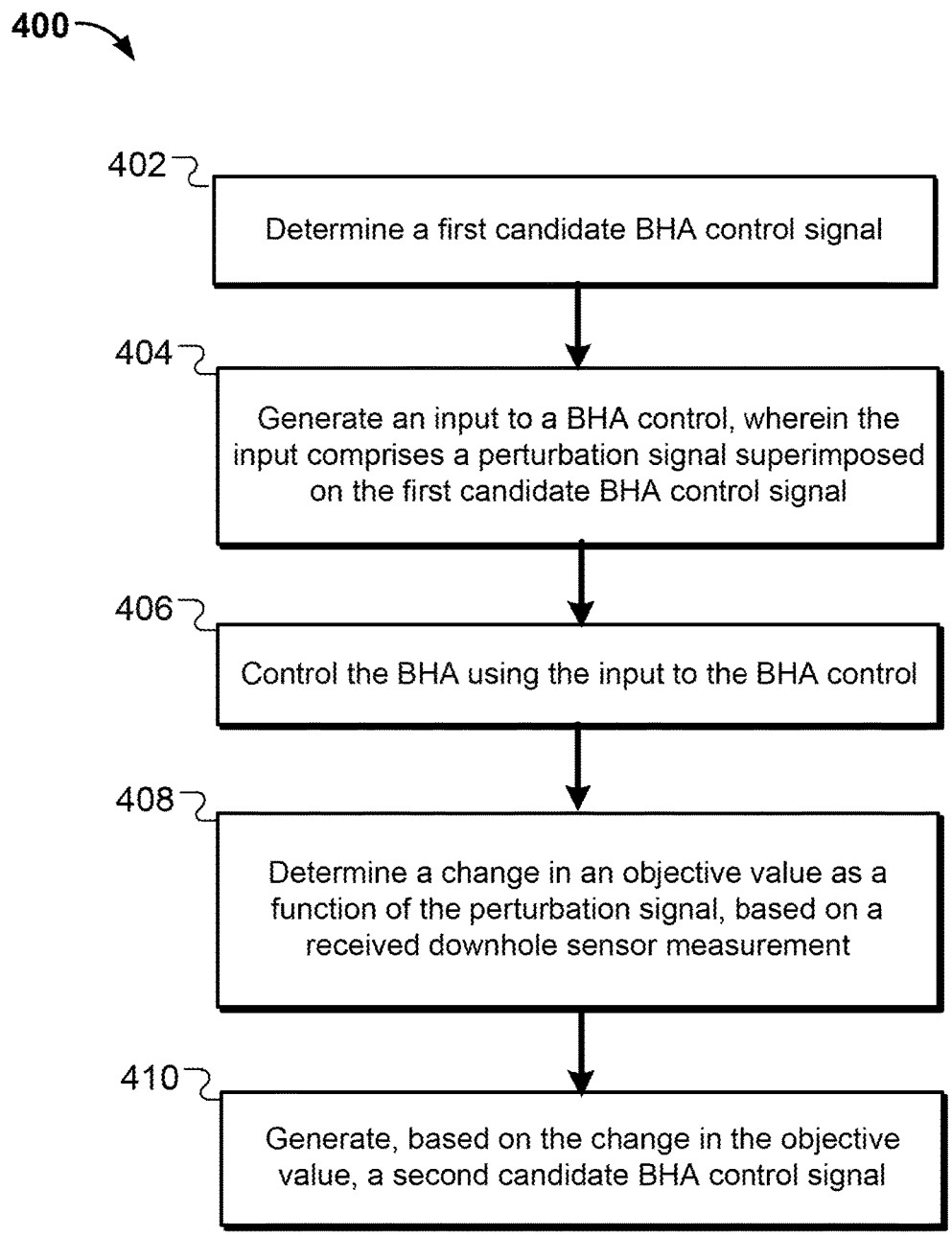
FIG. 4 is a flow chart of an example process for performing objective-seeking control of a BHA.

FIG. 4 is a flow chart of an example process for performing objective-seeking control of a BHA. One or more steps of the example process of FIG. 4 may be performed by a wellbore controller (e.g., controller 132 in FIG. 1). In this example, the controller determines a first candidate BHA control signal (402). The controller then generates an input to a BHA control, wherein the input includes a perturbation signal superimposed on the first candidate BHA control signal (404). The controller controls the BHA using the input to the BHA control (406) and determines a change in an objective value as a function of the perturbation signal, based on a received downhole sensor measurement (408). The controller then generates, based on the change in the objective value, a second candidate BHA control signal (410).

Figure 5:
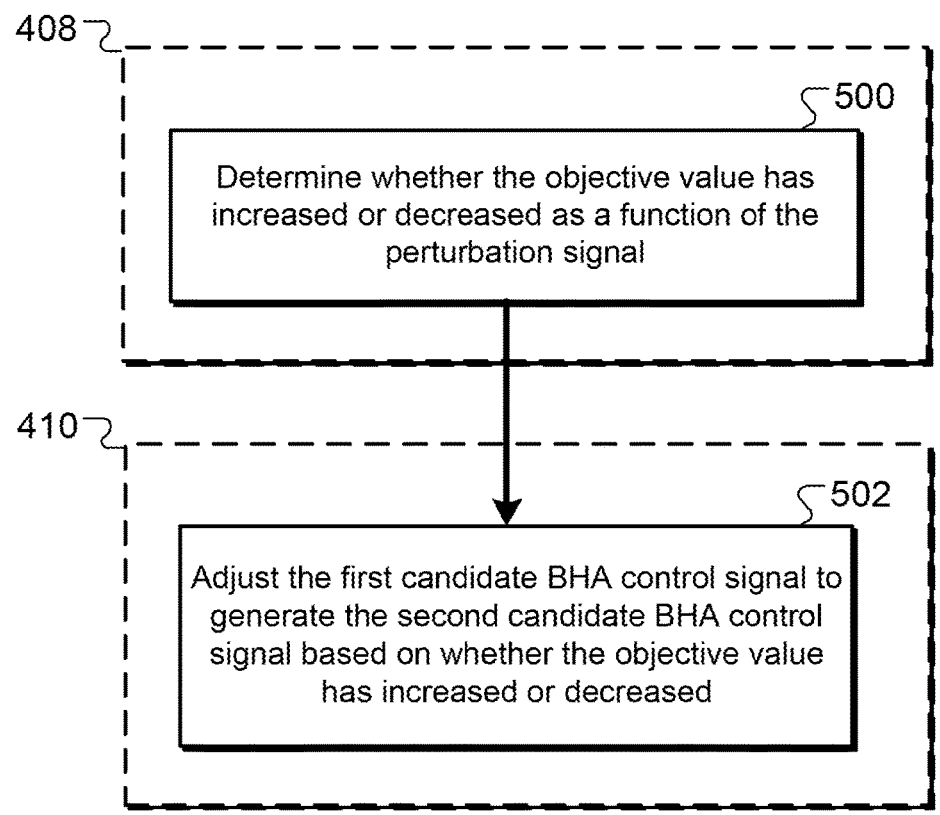
FIG. 5 is a flow chart of an example of further details of generating a second candidate BHA control signal based on changes in objective value of a drilling operation.

FIG. 5 is a flow chart of an example of further details of generating a second candidate BHA control signal based on changes in objective value of a drilling operation (e.g., steps 408 and 410 in FIG. 4). In this example, the controller determines whether the objective value has increased or decreased as a function of the perturbation signal (500). The controller then adjusts the first candidate BHA control signal to generate the second candidate BHA control signal based on whether the objective value has increased or decreased (502).

Figure 6:
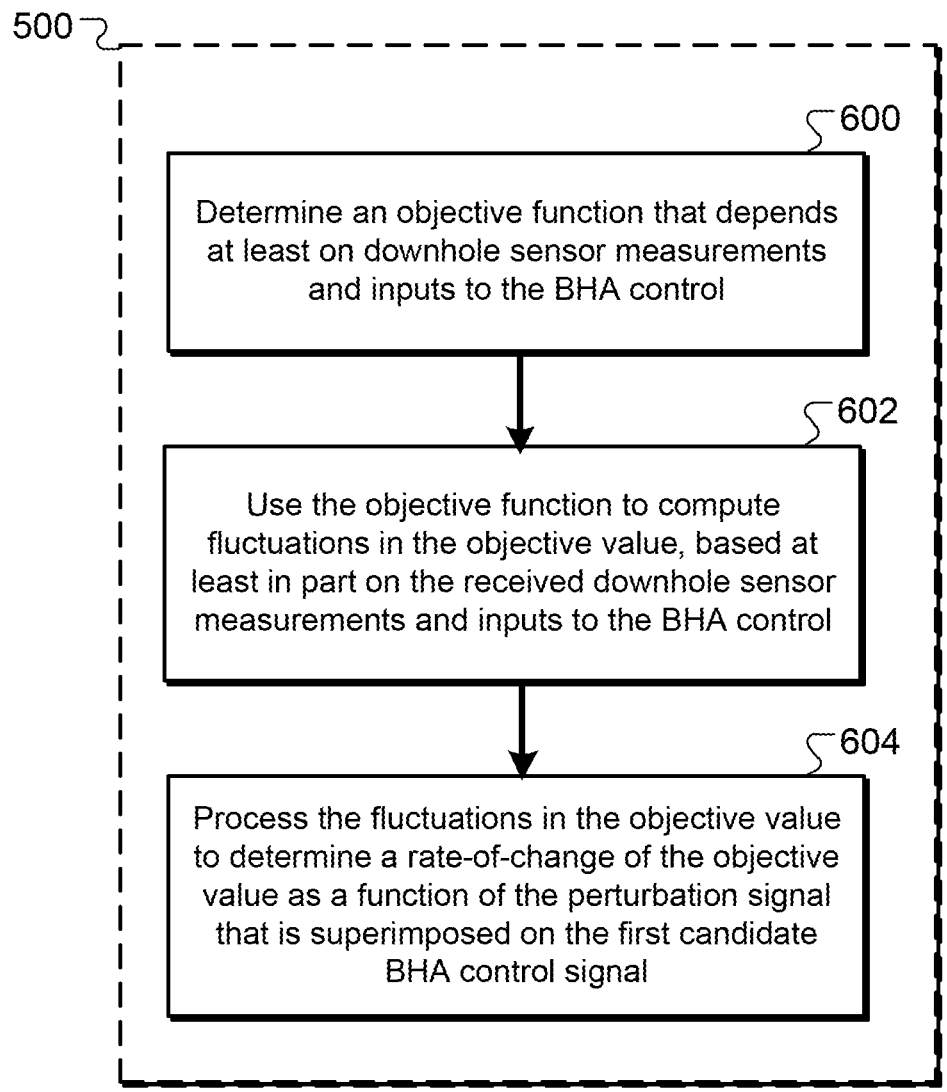
FIG. 6 is a flow chart of an example of further details of determining changes in an objective value of a drilling operation.

FIG. 6 is a flow chart of an example of further details of determining changes in an objective value of a drilling operation (e.g., step 500 in FIG. 5). In this example, the controller determines an objective function that depends at least on downhole sensor measurements and inputs to the BHA control (600). The controller then uses the objective function to compute fluctuations in the objective value, based at least in part on the received downhole sensor measurements and inputs to the BHA control (602). The controller processes the fluctuations in the objective value to determine a rate-of-change of the objective value as a function of the perturbation signal that is superimposed on the first candidate BHA control signal (604).

Figure 7:
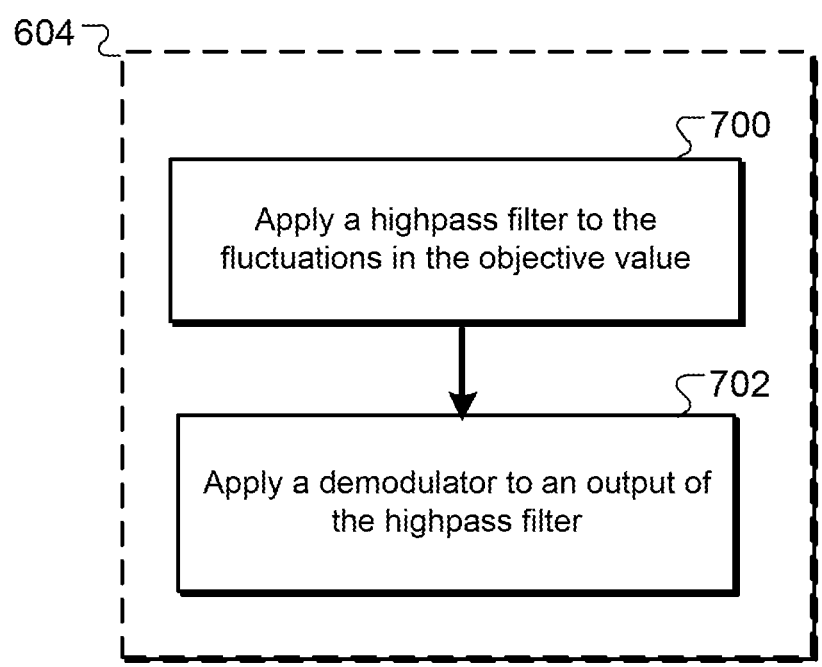
FIG. 7 is a flow chart of an example of further details of determining changes in an objective value of a drilling operation by applying filtering and demodulation operations.

FIG. 7 is a flow chart of an example of further details of determining changes in an objective value of a drilling operation (e.g., step 604 in FIG. 6) by applying filtering and demodulation operations. In this example, the controller applies a highpass filter to the fluctuations in the objective value (700) and then applies a demodulator to an output of the highpass filter (702).

Figure 8:
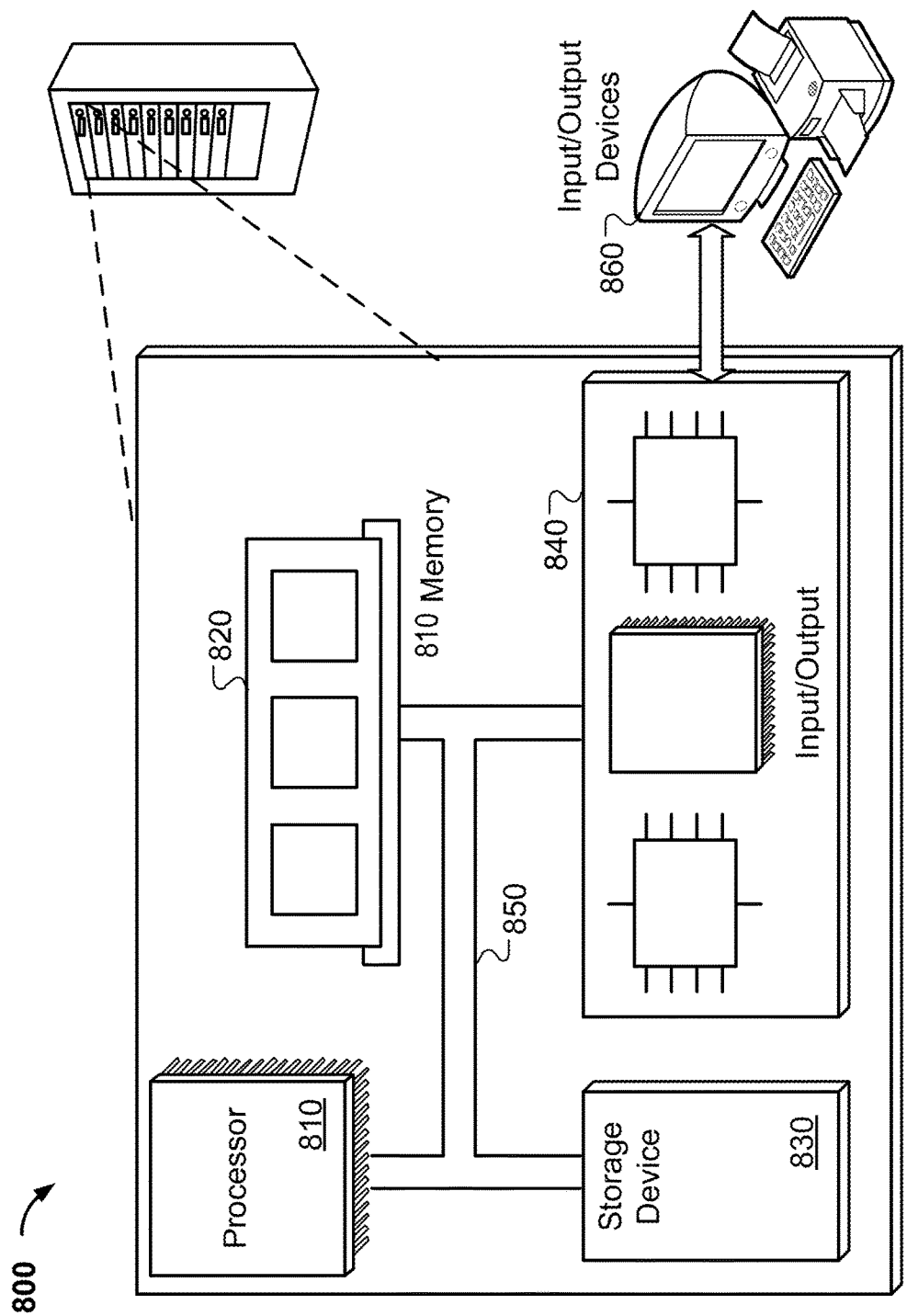
FIG. 8 is a block diagram of an example of a control system on which some examples may operate.

FIG. 8 is a block diagram of an example of a computer system 800. For example, referring to FIG. 1, one or more parts of the controller 132 could be an example of the system 800 described here, such as a computer system used by any of the users who access resources of the wellbore system 100. The system 800 includes a processor 810, a memory 820, a storage device 830, and an input/output device 840. Each of the components 810, 820, 830, and 840 can be interconnected, for example, using a system bus 850. The processor 810 is capable of processing instructions for execution within the system 800. In some implementations, the processor 810 is a single-threaded processor. In some implementations, the processor 810 is a multi-threaded processor. In some implementations, the processor 810 is a quantum computer. The processor 810 is capable of processing instructions stored in the memory 820 or on the storage device 830. The processor 810 may execute operations such as determining a cost function, generating a steady-state initial control, filtering and demodulating, etc. (e.g., FIGS. 4 to 7).

The memory 820 stores information within the system 800. In some implementations, the memory 820 is a computer-readable medium. In some implementations, the memory 820 is a volatile memory unit. In some implementations, the memory 820 is a non-volatile memory unit.

The storage device 830 is capable of providing mass storage for the system 800. In some implementations, the storage device 830 is a computer-readable medium. In various different implementations, the storage device 830 can include, for example, a hard disk device, an optical disk device, a solid-date drive, a flash drive, magnetic tape, or some other large capacity storage device. In some implementations, the storage device 830 may be a cloud storage device, e.g., a logical storage device including multiple physical storage devices distributed on a network and accessed using a network. In some examples, the storage device may store long-term data, such as rock formation data or ROP design capabilities. The input/output device 840 provides input/output operations for the system 800.

In some implementations, the input/output device 840 can include one or more of a network interface devices, e.g., an Ethernet card, a serial communication device, e.g., an RS-232 port, and/or a wireless interface device, e.g., an 802.11 card, a 3G wireless modem, a 4G wireless modem, or a carrier pigeon interface. A network interface device allows the system 800 to communicate, for example, transmit and receive instructions to and from the controller 132 in FIG. 1. In some implementations, the input/output device can include driver devices configured to receive input data and send output data to other input/output devices, e.g., keyboard, printer and display devices 860. In some implementations, mobile computing devices, mobile communication devices, and other devices can be used.

A server (e.g., a server forming a portion of the controller 132 or the wellbore system 100 shown in FIG. 1) can be realized by instructions that upon execution cause one or more processing devices to carry out the processes and functions described above, for example, such as determining cost functions, filtering and demodulating, etc. (e.g., FIGS. 4 to 7). Such instructions can include, for example, interpreted instructions such as script instructions, or executable code, or other instructions stored in a computer readable medium. Different components of a wellbore system 100 can be distributively implemented over a network, such as a server farm, or a set of widely distributed servers or can be implemented in a single virtual device that includes multiple distributed devices that operate in coordination with one another. For example, one of the devices can control the other devices, or the devices may operate under a set of coordinated rules or protocols, or the devices may be coordinated in another fashion. The coordinated operation of the multiple distributed devices presents the appearance of operating as a single device.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations have been described. Nevertheless, it will be understood that various modifications may be made. For example, additional aspects of process 400 may include more steps or fewer steps than those illustrated in FIGS. 4 to 7. Further, the steps illustrated in FIGS. 4 to 7 may be performed in different successions than that shown in the figures. Moreover, although the concepts have been described in the context of a wellbore drilling system, the concepts could be applied to other processes as well. For example, in connection with medical endoscopic examination or other applications where an instrument is inserted and controlled inside of an unknown environment. Accordingly, other implementations are within the scope of the following claims.

What is claimed is:

1. A computer-implemented method of controlling a bottom hole assembly (BHA), the method comprising:
   determining, by a wellbore controller, a first candidate BHA control signal;
   generating, by the wellbore controller, an input to a BHA control, the input comprising a perturbation signal superimposed on the first candidate BHA control signal;
   controlling, by the wellbore controller, the BHA using the input to the BHA control;

determining, by the wellbore controller, a change in an objective value as a function of the perturbation signal, based on a received downhole sensor measurement; and generating, by the wellbore controller and based on the change in the objective value, a second candidate BHA control signal.

2. The computer-implemented method of claim 1, wherein determining a change in an objective value as a function of the perturbation signal, based on a received downhole sensor measurement, comprises:

determining whether the objective value has increased or decreased as a function of the perturbation signal; and generating, based on the change in the objective value, a second candidate BHA control signal comprises adjusting the first candidate BHA control signal to generate the second candidate BHA control signal based on whether the objective value has increased or decreased.

3. The computer-implemented method of claim 2, wherein the objective value represents a cost of drilling, and adjusting the first candidate BHA control signal to generate the second candidate BHA control signal comprises:

increasing the amplitude of the first candidate BHA control signal if the objective value has decreased as a function of the perturbation signal;

decreasing the amplitude of the first candidate BHA control signal if the objective value has increased as a function of the perturbation signal; and maintaining the amplitude of the first candidate BHA control signal if the objective value has remained the same as a function of the perturbation signal.

4. The computer-implemented method of claim 2, wherein the objective value represents a desired performance of drilling and adjusting the first candidate BHA control signal to generate the second candidate BHA control signal comprises:

decreasing the amplitude of the first candidate BHA control signal if the objective value has decreased as a function of the perturbation signal;

increasing the amplitude of the first candidate BHA control signal if the objective value has increased as a function of the perturbation signal; and maintaining the amplitude of the first candidate BHA control signal if the objective value has remained the same as a function of the perturbation signal.

5. The computer-implemented method of claim 2, wherein determining whether the objective value has increased or decreased as a function of the perturbation signal comprises:

determining an objective function that depends, at least in part, on downhole sensor measurements and inputs to the BHA control;

using the objective function to compute fluctuations in the objective value, based at least in part, on the received downhole sensor measurements and inputs to the BHA control; and processing the fluctuations in the objective value to determine a rate-of-change of the objective value as a function of the perturbation signal that is superimposed on the first candidate BHA control signal.

6. The computer-implemented method of claim 5, wherein processing the fluctuations in the objective value to determine a rate-of-change of the objective value as a function of the perturbation signal that is superimposed on the first candidate BHA control signal comprises:

applying a highpass filter to the fluctuations in the objective value; and applying a demodulator to an output of the highpass filter.

7. The computer-implemented method of claim 6, further comprising:

applying a lowpass filter to the demodulated output of the highpass filter; and applying an integrator to an output of the lowpass filter.

8. The computer-implemented method of claim 6, wherein at least one of the highpass filter or the demodulator is matched to the perturbation signal.

9. The computer-implemented method of claim 1, wherein:

the perturbation signal comprises a sinusoidal signal, and at least one of the highpass filter or the demodulator has a center frequency that is tuned to an oscillating frequency of the sinusoidal signal.

10. The computer-implemented method of claim 5, wherein determining a first candidate BHA control signal comprises determining a steady-state solution to the objective function.

11. The computer-implemented method of claim 10, wherein determining a steady-state solution to the objective function comprises:

determining a steady-state model of BHA dynamics by performing system identification using received downhole sensor measurements;

determining the objective function as a combination of drilling metrics that are based on the received downhole sensor measurements; and determining a steady-state solution to the objective function based on the steady-state model of BHA dynamics.

12. The computer-implemented method of claim 11, wherein the drilling metrics include at least one of a BHA control input energy, an energy dissipation ratio, drill bit wear, mud motor wear, a target energy efficiency, or a target rate of penetration (ROP).

13. The computer-implemented method of claim 11, wherein determining a steady-state model of BHA dynamics is based on at least one of predictions of BHA dynamics or data from other wellbores, and determining the objective function further comprises determining at least one weighting factor indicative of a relative value of the drilling metrics.

14. The computer-implemented method of claim 10, further comprising:

receiving updated downhole sensor measurements;

determining an updated steady-state solution to the objective function based on the received updated downhole sensor measurements; and determining an updated first candidate BHA control signal based on the updated steady-state solution to the objective function.

15. The computer-implemented method of claim 14, wherein determining an updated steady-state solution to the objective function comprises at least one of determining an updated model of BHA dynamics or determining an updated objective function.

16. The computer-implemented method of claim 15, wherein determining an updated objective function is based on at least one of received downhole sensor measurements, customer data, performance metrics, or manufacturing specifications.

17. The computer-implemented method of claim 1, further comprising:

generating an updated input to the BHA control, wherein the updated input comprises an updated perturbation signal superimposed on the second candidate BHA control signal;

controlling the BHA using the updated input to the BHA control;

determining an updated change in the objective value as a function of the updated perturbation signal; and generating, based on the updated change in the objective value, a third candidate BHA control signal.

18. The computer-implemented method of claim 1, wherein the input to the BHA control comprises at least one of torque on bit or weight on bit and the downhole sensor measurement corresponds to at least one of tension, torsion, bending, or vibration.

19. A system comprising:

a bottom hole assembly (BHA) associated with at least one sensor; and a controller communicably coupled to the BHA, the controller operable to perform operations comprising:

determining a first candidate BHA control signal;

generating an input to a BHA control, the input comprising a perturbation signal superimposed on the first candidate BHA control signal;

controlling the BHA using the input to the BHA control;

determining a change in an objective value as a function of the perturbation signal, based on a received downhole sensor measurement; and generating, based on the change in the objective value, a second candidate BHA control signal.

20. A non-transitory computer-readable storage medium encoded with at least one computer program comprising instructions that, when executed, operate to cause at least one processor to perform operations to control a bottom hole assembly (BHA), the operations comprising:

determining a first candidate BHA control signal;

generating an input to a BHA control, the input comprising a perturbation signal superimposed on the first candidate BHA control signal;

controlling the BHA using the input to the BHA control;

determining a change in an objective value as a function of the perturbation signal, based on a received downhole sensor measurement; and generating, based on the change in the objective value, a second candidate BHA control signal.

* * * * *